US009084152B2

(12) United States Patent
Sambhwani et al.

(10) Patent No.: US 9,084,152 B2
(45) Date of Patent: Jul. 14, 2015

(54) METHODS AND APPARATUSES FOR PROVIDING INTER-RADIO-NETWORK-CONTROLLER MULTIFLOW CAPABILITY

(71) Applicant: QUALCOMM Incorporated, San Diego, CA (US)

(72) Inventors: Sharad Deepak Sambhwani, San Diego, CA (US); Andrei Dragos Radulescu, San Diego, CA (US); Rohit Kapoor, San Diego, CA (US); Francesco Pica, San Diego, CA (US); Ravi Agarwal, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 239 days.

(21) Appl. No.: 13/772,171

(22) Filed: Feb. 20, 2013

(65) Prior Publication Data

US 2013/0303224 A1 Nov. 14, 2013

Related U.S. Application Data

(60) Provisional application No. 61/646,233, filed on May 11, 2012.

(51) Int. Cl.
*H04B 7/00* (2006.01)
*H04W 28/10* (2009.01)
*H04W 76/02* (2009.01)
*H04W 36/10* (2009.01)
*H04W 36/00* (2009.01)

(52) U.S. Cl.
CPC ............ *H04W 28/10* (2013.01); *H04W 76/025* (2013.01); *H04W 36/00* (2013.01); *H04W 36/10* (2013.01)

(58) Field of Classification Search
CPC ..... H04W 36/00; H04W 36/10; H04W 36/08; H04W 92/12; H04W 92/22
USPC .............. 455/517, 500, 436–444, 422.1, 403, 455/550.1, 560, 561, 435, 2, 509, 515, 507, 455/450, 445; 370/328, 235, 338, 331, 310
See application file for complete search history.

(56) References Cited

U.S. PATENT DOCUMENTS 7,991,398 B2    8/2011  Rune
2003/0013446 A1*  1/2003  Haumont et al. ............. 455/436
(Continued)

FOREIGN PATENT DOCUMENTS

EP          2291048 A1    3/2011

OTHER PUBLICATIONS

International Search Report and Written Opinion—PCT/US2013/040373—ISA/EPO—Oct. 24, 2013.
(Continued)

*Primary Examiner* — Keith Ferguson
(74) *Attorney, Agent, or Firm* — Charles Chesney

(57) ABSTRACT

The present disclosure presents example methods and apparatuses for improved cell searching in a wireless communications environment. For example, the disclosure presents example methods of wireless communication in a multiflow environment, which may include establishing a first flow between a serving radio network controller (S-RNC) and a first network entity, wherein the S-RNC controls the first network entity. Such example methods may also include establishing a second flow between the S-RNC and a second network entity. Furthermore, such example methods may include transmitting data to a user equipment (UE) via both the first flow and the second flow.

24 Claims, 7 Drawing Sheets

(56) References Cited

U.S. PATENT DOCUMENTS

| | | | |
|---|---|---|---|
| 2007/0155414 A1 | 7/2007 | Zhuang | |
| 2008/0268852 A1* | 10/2008 | Petrovic et al. | 455/442 |
| 2010/0080121 A1 | 4/2010 | Shimada et al. | |
| 2010/0220594 A1 | 9/2010 | Racz et al. | |
| 2011/0281570 A1* | 11/2011 | Shi et al. | 455/418 |
| 2012/0163315 A1 | 6/2012 | Govindappa et al. | |

OTHER PUBLICATIONS

Nokia Siemens Networks et al., "Multiflow performance evaluation", 3GPP Draft; R1-111141, 3rd Generation Partnership Project (3GPP), Mobile Competence Centre; 650, Route Des Lucioles ; F-06921 Sophia-Antipolis Cedex; France, vol. RAN WG1, No. Taipei, Taiwan; Feb. 21, 2011, Feb. 24, 2011, XP050490865, [retrieved on Feb. 24, 2011] chapters 2 and 3.

Nokia Siemens Networks: "Further considerations on Multiflow impacts in RAN3", 3GPP Draft; R3-120716 MF Impacts V19, 3rd Generation Partnership Project (3GPP), Mobile Competence Centre; 650, Route Des Lucioles; F-06921 Sophia-Antipolis Cedex; France vol. RAN WG3, No. San Jose Del Cabo, Mexico; Mar. 26, 2012-Mar. 30, 2013 Apr. 2, 2012, XP050669069, Retrieved from the Internet: URL: http://www.3gpp.org/ftp/tsg_ran/WG3_lu/TSGR3_75bis/Docs/ [retrieved on Apr. 2, 2012] chapters 2.1 and 3.1.

* cited by examiner

METHODS AND APPARATUSES FOR PROVIDING INTER-RADIO-NETWORK-CONTROLLER MULTIFLOW CAPABILITY

CLAIM OF PRIORITY UNDER 45 U.S.C. §119

The present Application for Patent claims priority to Provisional Application No. 61/646,233 filed May 11, 2012, entitled "Methods and Apparatuses for Providing Inter-Radio-Network-Controller Multiflow Capability," which is assigned to the assignee hereof, and hereby expressly incorporated by reference herein.

BACKGROUND

1. Field

Aspects of the present disclosure relate generally to wireless communication systems, and more particularly, to flow control in multiflow environments.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Furthermore, some modern wireless communication systems can support multiflow communications, wherein a user equipment (UE) operating in the wireless communication system may simultaneously communicate with more than one NodeB via more than one flow. Such multiflow functionality increases data rates, thereby providing the UE user with a pleasant communication experience.

Legacy multiflow communications systems, methods, and apparatuses, however, have only allowed for UE communication with NodeBs that are controlled by the same radio network controller (RNC). Therefore, where a multiflow-capable UE communicating with a serving NodeB is in range of a second NodeB controlled by an RNC different than the RNC controlling the serving NodeB, the UE may not take advantage of its multiflow capability.

Thus, methods and apparatuses are needed to improve multiflow functionality in inter-RNC situations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure presents example methods of wireless communication, which may include establishing a first flow between a serving radio network controller (S-RNC) and a first network entity, wherein the S-RNC controls the first network entity. In addition, such example methods may include establishing a second flow between the S-RNC and a second network entity, and transmitting data to a UE via both the first flow and the second flow.

Furthermore, the present disclosure presents example apparatuses for multiflow wireless communication, which may include means for establishing a first flow between a S-RNC and a first network entity, wherein the S-RNC controls the first network entity, means for establishing a second flow between the S-RNC and a second network entity, and means for transmitting data to a UE via both the first flow and the second flow Additionally, the present disclosure describes an example computer program product, which may include a computer-readable medium comprising machine-executable code for establishing a first flow between a S-RNC and a first network entity, wherein the S-RNC controls the first network entity, establishing a second flow between the S-RNC and a second network entity, and transmitting data to a UE via both the first flow and the second flow.

Furthermore, the present disclosure presents example apparatuses for wireless communication, which may include at least one processor and a memory coupled to the at least one processor. In such examples, the at least one processor may be configured to establish a first flow between a S-RNC and a first network entity, wherein the S-RNC controls the first network entity, establish a second flow between the S-RNC and a second network entity, and transmit data to a UE via both the first flow and the second flow.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION OF THE DRAWINGS

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to aspects of the present disclosure, methods and apparatuses for supporting multiflow communication between a network and a UE are presented, wherein the UE may receive and transmit signals from a plurality of network entities, such as NodeBs, which are controlled by separate RNCs. By providing such inter-RNC multiflow communication capability, more robust communication in wireless networks may be achieved.

Figure 1:
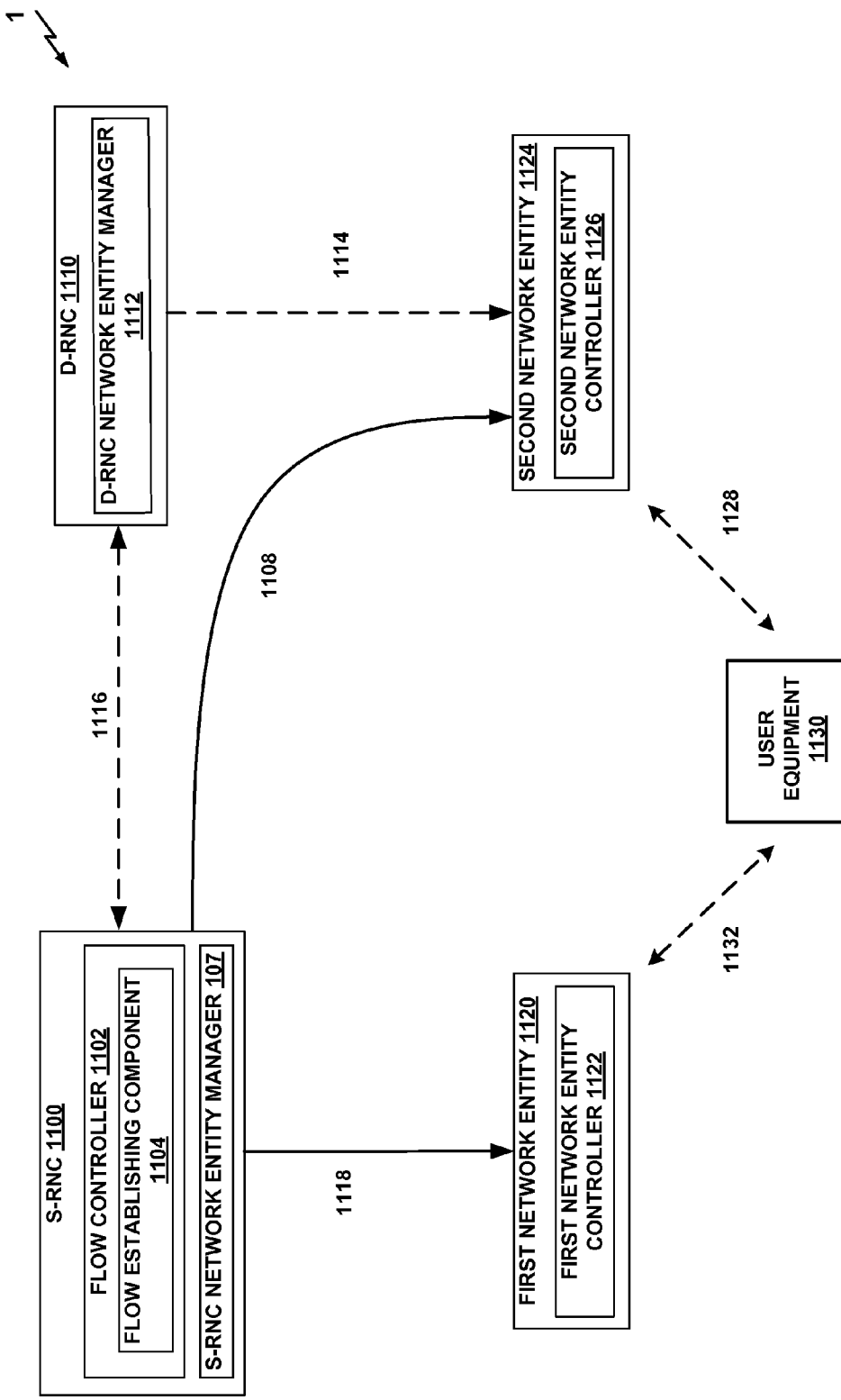
FIG. 1 is a system diagram illustrating aspects of an inter-RNC multiflow capable wireless environment according to the present disclosure.

FIG. 1 illustrates a multiflow-capable wireless environment 1 that allows for intra-RNC multiflow functionality. In an aspect, wireless environment 1 may provide data, voice, or other services to a UE 1130 via a plurality of flows, which may be transmitted to UE 1130 over the air via wireless links 1132 and/or 1128, which wirelessly connect the UE 1130 to a first network entity 1120 and/or a second network entity 1126, respectively. Furthermore, in some examples, UE 1130 may be in handover, such as, but not limited to, soft or softer handover, from a serving NodeB, such as first network entity 1120, to a target NodeB, such as second network entity 1124, or may otherwise be in close proximity to a candidate for handover or reselection.

According to some aspects, first network entity 1120 may include a first network entity controller 1122, which may be configured to receive and forward data via first flow 1118 and/or wireless link 1132 and otherwise control communication operations associated with first network entity 1120. Likewise, second network entity 1124 may include a second network entity controller 1126, which may perform similar functions in relation to second network entity 1124. In a further aspect, first network entity 1120 may be controlled by a serving radio network controller (S-RNC) 1100 and second network entity 1124 may be controlled by a drain radio network controller (D-RNC) 1110. In an aspect, control of first network entity 1120 may be managed by S-RNC network entity manager 107 and control of second network entity 1124 may be managed by D-RNC network entity manager 1112.

Additionally, S-RNC 1100 may be configured to control data routing from the network to UE 1130 via one or more flows, such as, but not limited to, a first flow 1118 and/or a second flow 1108. For example, S-RNC may include a flow controller 1102, which may be configured to schedule, assign, or otherwise manage data transmission from S-RNC 1100 to UE 1130, even where such data transmission may implicate one or more network components (e.g. second network entity 1124 or even D-RNC 1110) not under direct control by S-RNC 1100. In a further aspect, flow controller 1102 may include a flow establishing component 1104, which may be configured to establish one or more flows, data paths, or other communication avenues between S-RNC 1100 and one or more network components. For example, flow establishing component 1104 may establish first flow 1118 between S-RNC 1100 and first network entity 1120 and/or a second flow 1108 between S-RNC 1100 and second network entity 1124.

Furthermore, in some examples, second flow 1108 may be a direct link between S-RNC 1100 and second network entity 1124 or may include sub-links, such as, but not limited to, an inter-RNC link 1116 (e.g. an Iur link) and an RNC-network entity link 1114. In other words, according to aspects of the present disclosure, S-RNC 1100 may communicate with second network entity 1124 directly or D-RNC 1100 may serve as an intermediary in second flow 1108.

Thus, as shown, the multiflow-capable wireless environment 1 may include first network entity controller 1122, flow controller 1102, flow establishing component 1104, S-RNC network entity manager 107, D-RNC network entity manager 1112, and second network entity controller 1126, for example, to carry out method(s) associated with those components, such as those discussed herein. Additional explanation of the operation of these various components will be provided below.

It should be noted that the components (also referred to herein as modules and/or means) of FIG. 1 may be, for example, hardware components specifically configured to carry out the stated processes/algorithm, software components implemented by a processor configured to perform the stated processes/algorithm, and/or software components stored within a computer-readable medium for implementation by a processor, or some combination.

Figure 2:
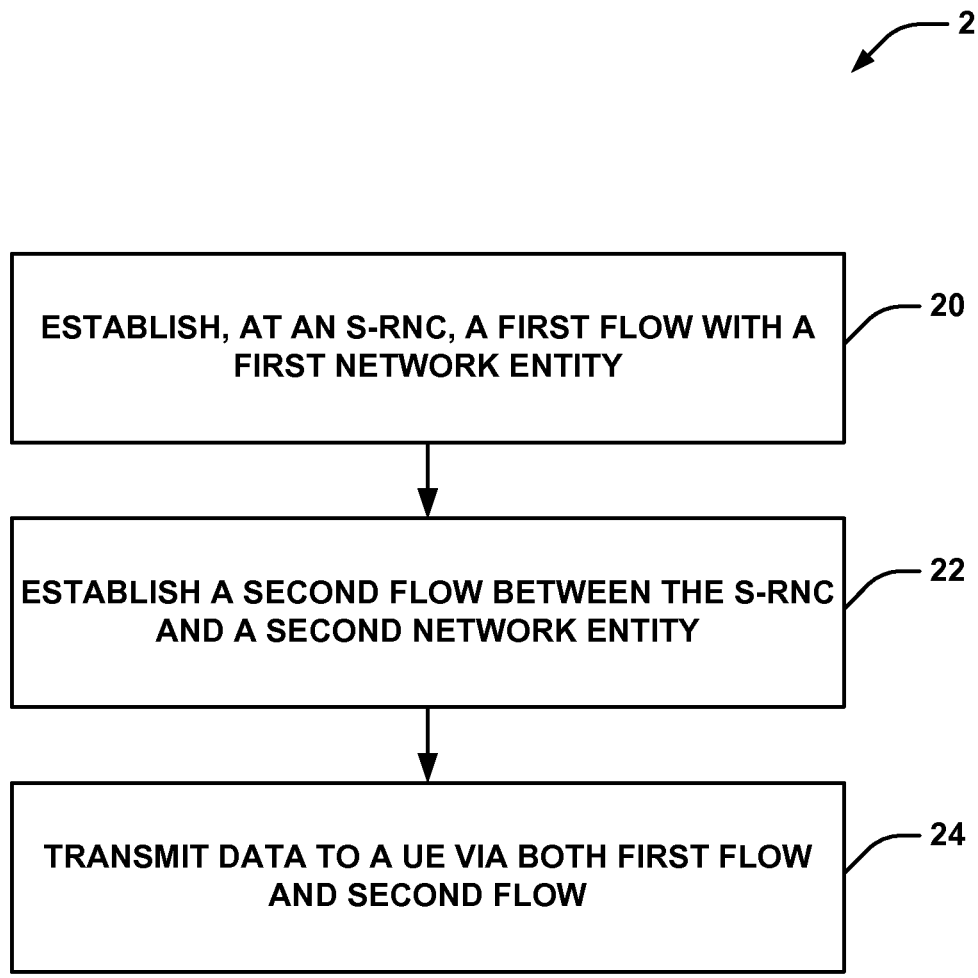
FIG. 2 is a flow diagram illustrating aspects of an example methodology for supporting inter-RNC multiflow communication according to the present disclosure.

FIG. 2 illustrates an example methodology 2 for supporting intra-RNC multiflow communication functionality. In an aspect, at block 20, an S-RNC (e.g S-RNC 1100 of FIG. 1) and/or a flow establishing component 1104 (FIG. 1) may establish a first flow with a first network entity (e.g. a serving base station or NodeB), wherein the first network entity is controlled by the S-RNC. For example, the flow establishing component 1104, residing in flow controller 1102, may be configured for executing instructions for establishing a first flow 1118 with UE 1130 via the first network entity 1120 (FIG. 1).

Furthermore, at block 22, the S-RNC (and/or other network components such as, but not limited to, a D-RNC or network entity controlled by the D-RNC) and/or a flow establishing component therein, may establish a second flow between the S-RNC and a second network entity controlled by the D-RNC. For example, the flow establishing component 1104, residing in flow controller 1102, may be configured for executing instructions for establishing a second flow 1108 (or 1116 and 1114 via D-RNC) with UE 1130 via the second network entity 1124 (FIG. 1).

Additionally, in some examples, the S-RNC or flow controller therein (e.g. flow controller 1102 of FIG. 1) may transmit a request, which may be a radio link setup request (e.g. an RNSAP Radio Link Setup Request per 3GPP specification 25.423, §9.1.3.1), to the D-RNC. In some examples, such requests may include a Transport Layer Address and/or a Binding ID in HS-DSCH Information associated with the S-RNC. Furthermore, based on the request, the D-RNC may request the second network entity to set up multiflow leg, for example, via a NBAP Radio Link Setup Request (e.g. per 3GPP specification 25.433, §9.1.36.1). In addition, the D-RNC may respond to the S-RNC with a RNSAP Radio Link Setup Response (e.g. per 3GPP Specification 25.423, §9.1.4.1), which may include a tunnel upstream pointer. In an aspect, such a tunnel upstream pointer may serve to forward one or more data packets to the second network entity and may include a Binding ID IE and/or Transport Layer Address in a HS-DSCH FDD Information Response (e.g. per 3GPP Specification 25.423, §9.2.2.19b), associated with the first network entity associated with the S-RNC.

Thus, in some examples, the second flow may be a direct communication link, data flow, or the like, between the S-RNC and the second network entity. In other examples, the second flow may travel from S-RNC to D-RNC via an inter-RNC link (e.g. Iur link) and then may be forwarded on to the second network entity by the D-RNC via a RNC-network entity link (e.g. Iub link).

In an additional aspect of methodology 2, the S-RNC may transmit data to a UE via both the first flow and the second flow at block 24. In some examples, therefore, the S-RNC may perform flow control over the first flow and the second flow. During such transmission, flows to network entities under the S-RNC's control may be sent over an RNC-network entity link (e.g. Iub link). Flows to network entities under D-RNC control, however, may depend on whether the second flow is a direct communication link between the S-RNC and the second network entity. In examples where the second flow is such a direct communication link, flows to network entities under D-RNC control may be sent directly to these network entities. To facilitate such direct communication, the D-RNC may configure a tunnel upstream end (e.g. an HSDPA tunnel upstream end) to point to the S-RNC, per S-RNC configuration. Alternatively, where the second flow includes an inter-RNC link (e.g. Iur link) and an RNC-network entity link (e.g. Iub link), flows to network entities under D-RNC control may be sent via the inter-RNC link to the D-RNC. In such instances, therefore, flow control will include data transmission between the S-RNC and the D-RNC and between the D-RNC and the second network entity. In such examples, the D-RNC is both upstream of the RNC-network entity link flow control (e.g. Iub flow control) and downstream of the inter-RNC flow control (e.g. Iur flow control). Additionally, in such instances, Iub flow control procedures may be replicated over the Iur, but their use may also be independent.

Figure 3:
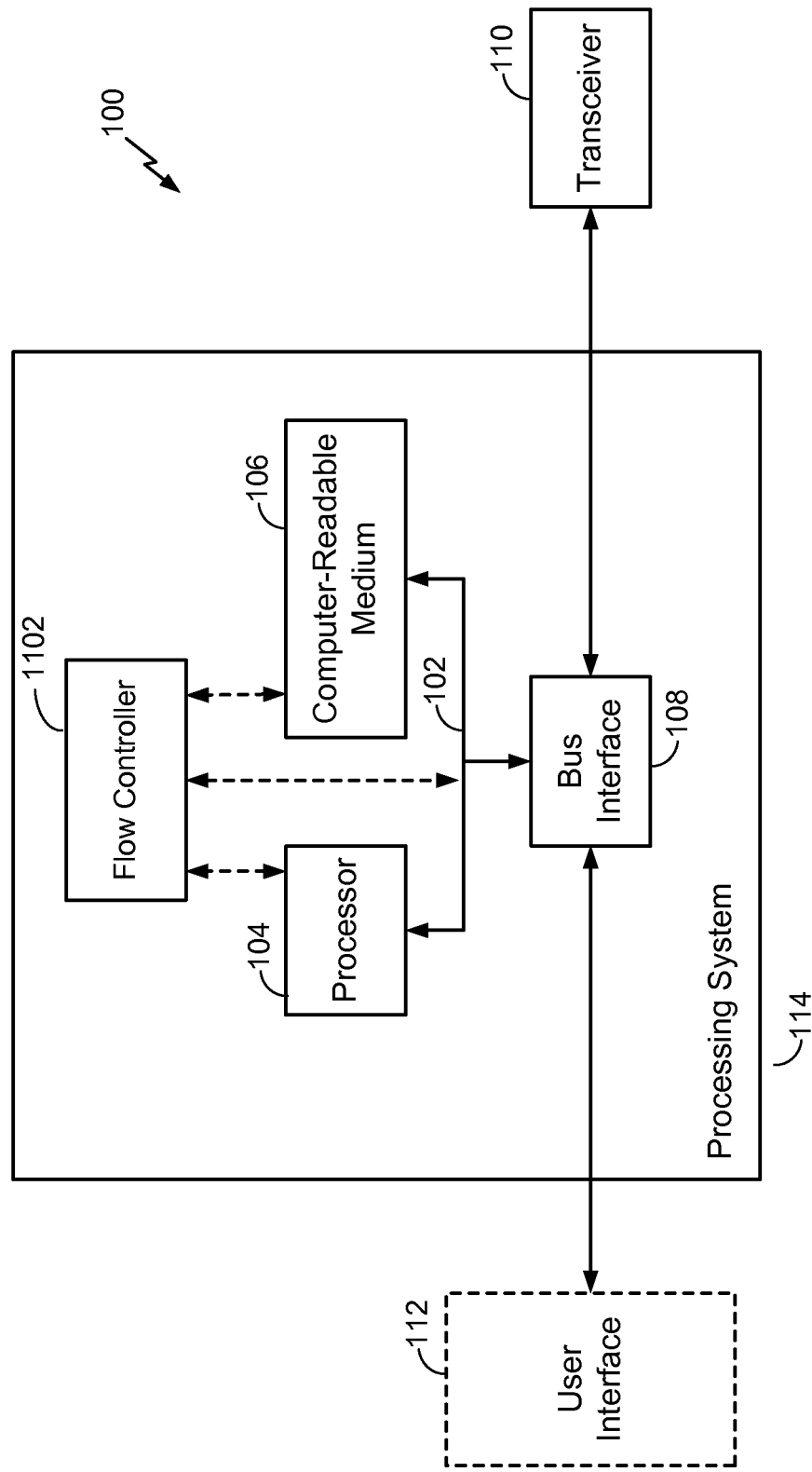
FIG. 3 is a block diagram illustrating an example of a hardware implementation for an apparatus employing a processing system.

FIG. 3 is a block diagram illustrating an example of a hardware implementation for an apparatus 100 employing a processing system 114 for managing data transmission flow, such as by implementing the processes associated with flow controller 1102 (FIG. 1). In this example, the processing system 114 may be implemented with a bus architecture, represented generally by a bus 102. The bus 102 may include any number of interconnecting buses and bridges depending on the specific application of the processing system 114 and the overall design constraints. The bus 102 links together various circuits including one or more processors, represented generally by the processor 104, computer-readable media, represented generally by the volatile or/or non-volatile computer-readable storage medium 106, and one or more components described herein, such as, but not limited to, the flow controller 1102 (FIG. 1), as well as S-RNC network entity manager 107, D-RNC network entity manager 1112, first network entity controller 1122, and second network entity controller 1126 (FIG. 1). It should be noted that elements 107, 1112, 1122, and 1126 are not illustrated in FIG. 3 but may be implemented by processing system 114. Furthermore, the flow controller 1102 may be implemented by the processor 104 and computer readable medium 106 operating in conjunction, as illustrated by the dotted lines connecting flow controller 1102 to the processor 104 and to the computer readable medium 106. Additionally, the bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable storage medium 106. The software, when executed by the processor 104, causes the processing system 114 to perform the various functions described infra for any particular apparatus. The computer-readable storage medium 106 may also be used for storing data that is manipulated by the processor 104 when executing software.

Thus, the flow controller 1102, S-RNC network entity manager 107, D-RNC network entity manager 1112, first network entity controller 1122, and second network entity controller 1126 may be a separate physical components, or a components implemented by processor 104 or stored in computer-readable storage medium 106, or a combination thereof.

Figure 4:
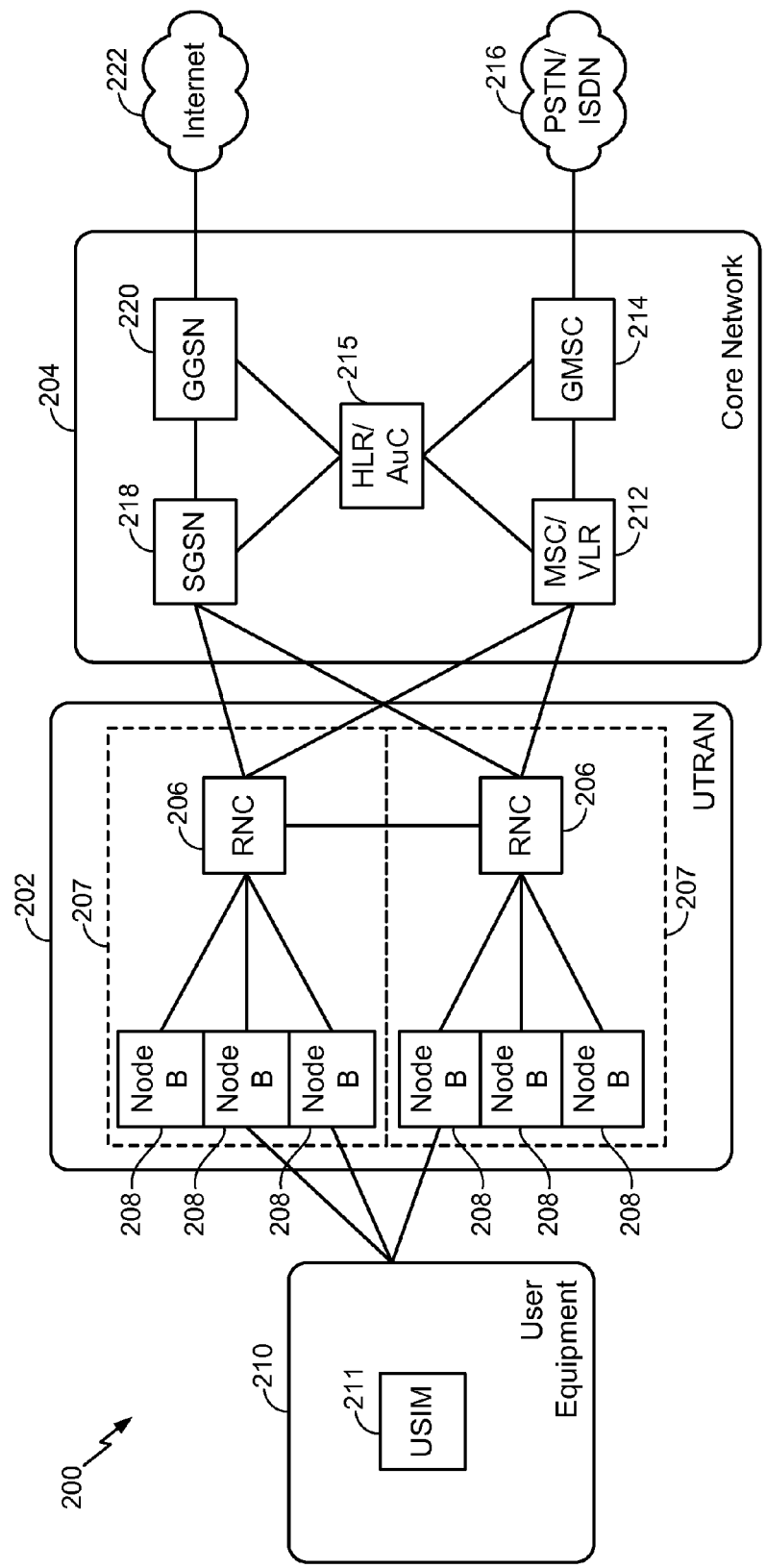
FIG. 4 is a block diagram conceptually illustrating an example of a telecommunications system.

Referring to FIG. 4, by way of example and without limitation, the aspects of the present disclosure are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. Node B 208 and/or UE 210, which respectively may include first network entity controller 1122 and UE 1130 of FIG. 1, and may be configured to include, for example, the flow controller 1102, S-RNC network entity manager 107, D-RNC network entity manager 1112, and second network entity controller 1126 for managing data transmission flows, as described above. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of UEs 210. Examples of a UEs include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The UE 210 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL). HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the channel quality indicator (CQI) and protocol control information (PCI).

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate, or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 5:
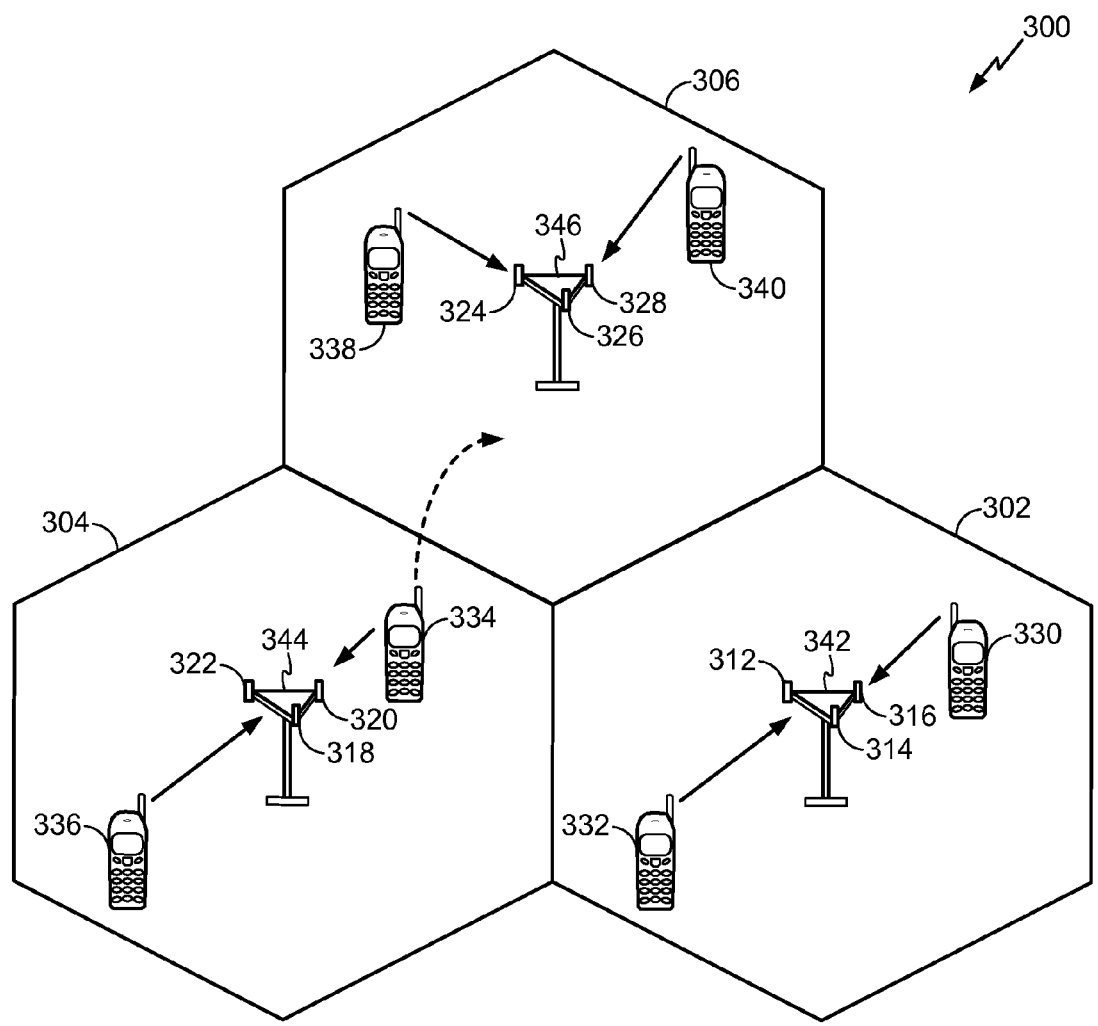
FIG. 5 is a conceptual diagram illustrating an example of an access network.

Referring to FIG. 5, an access network 300 in a UTRAN architecture is illustrated, including one or more Node Bs and/or one or more UEs respectively having the flow controller 1102, S-RNC network entity manager 107, D-RNC network entity manager 1112, first network entity controller 1122, and second network entity controller 1126 for managing data transmission flows, as described herein. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 4) for all the UEs 330, 332, 334, 336, 338, 340 in the respective cells 302, 304, and 306. Node Bs 342, 344, 346 and UEs 330, 332, 334, 336, 338, 340, which respectively may include first network entity controller 1122 and UE 1130 of FIG. 1, and may be configured to include, for example, the flow controller 1102, S-RNC network entity manager 107, D-RNC network entity manager 1112, first network entity controller 1122, and second network entity controller 1126 for managing data transmission flows, as described above.

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; LTE and LTE Advanced. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 6.

Figure 6:
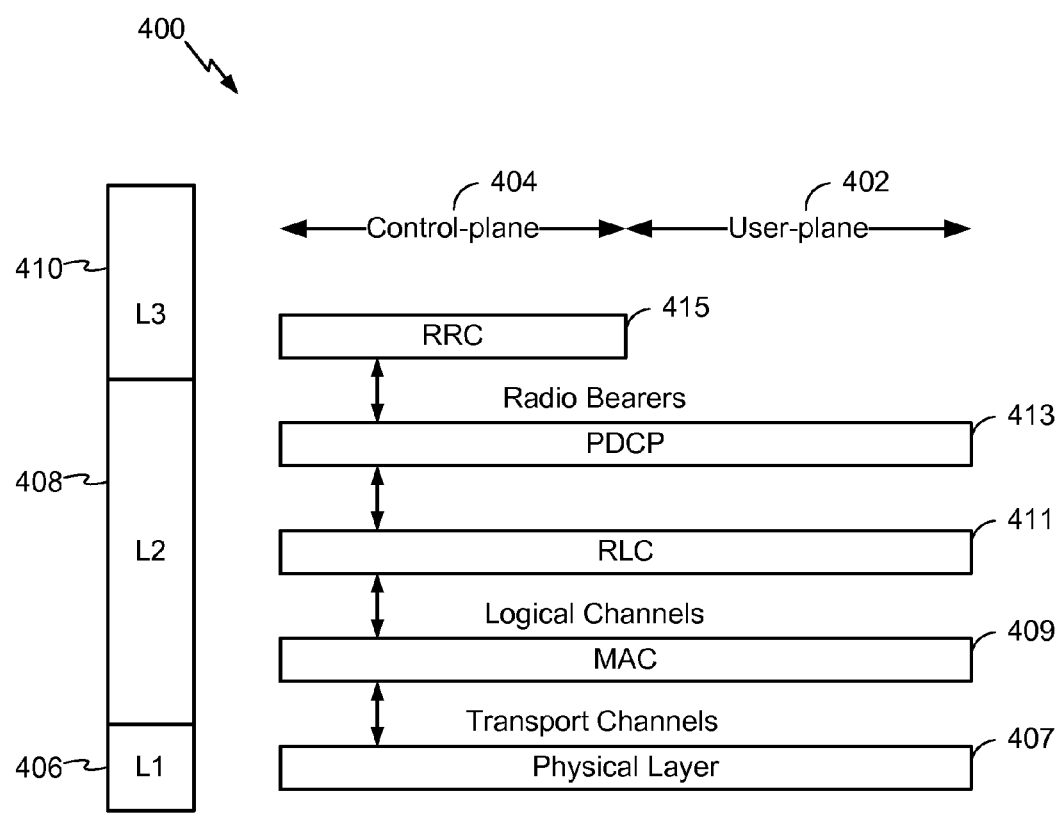
FIG. 6 is a conceptual diagram illustrating an example of a radio protocol architecture for the user and control plane.

FIG. 6 is a conceptual diagram illustrating an example of the radio protocol architecture 400 for the user plane 402 and the control plane 404 of a user equipment (UE) or node B/base station. For example, architecture 400 may be implemented, for example, by software executed by a processor at an RNC (e.g. S-RNC, D-RNC, first network entity 1120, and second network entity 1124) and/or UE. Indeed, architecture 400 may be included in a network entity and/or UE such as first network entity controller 1122 and UE 1130 (FIG. 1), and may be configured to include, for example, the flow controller 1102, S-RNC network entity manager 107, D-RNC network entity manager 1112, and second network entity controller 1126 for managing data transmission flows, as described above. The radio protocol architecture 400 for the UE and UTRAN is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 7:
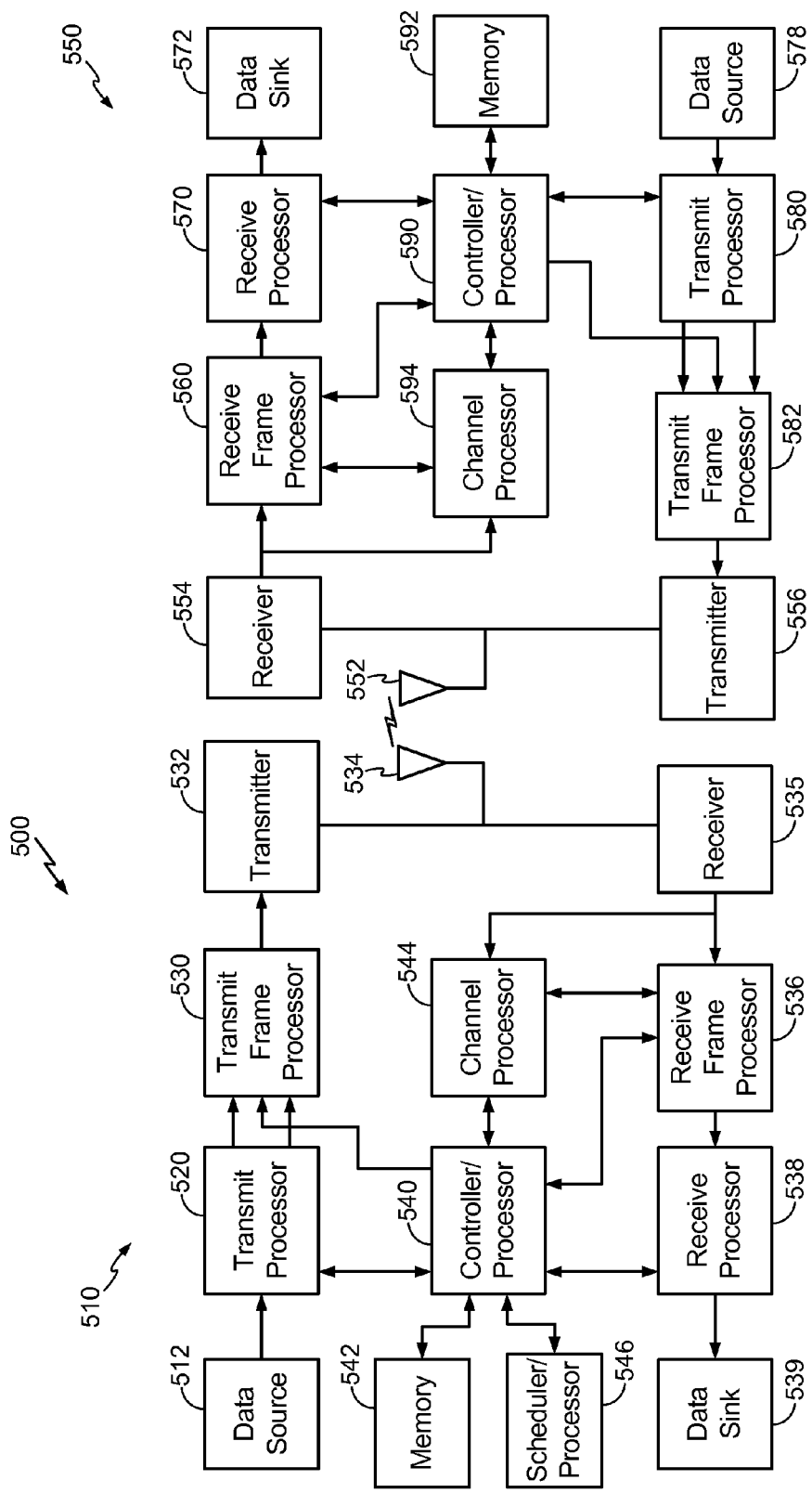
FIG. 7 is a block diagram conceptually illustrating an example of a Node B in communication with a UE in a telecommunications system.

FIG. 7 is a block diagram of a communication system 500 including a Node B 510 in communication with a UE 550, where Node B 510 may be an entity such as first network entity controller 1122 and UE 1130 (FIG. 1), and may be configured to include, for example, the flow controller 1102, S-RNC network entity manager 107, D-RNC network entity manager 1112, and second network entity controller 1126 for managing data transmission flows, as described above. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors, such as processor 104 (FIG. 3), and/or processors 540 and 590 (FIG. 7). Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium, such as computer readable medium 106 (FIG. 3). The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication in a multiflow environment, comprising:
   establishing a first flow between a serving radio network controller (S-RNC) and a first network entity, wherein the S-RNC controls the first network entity;
   establishing a second flow directly between the S-RNC and a second network entity, wherein a drift radio network controller (D-RNC) controls the second network entity; and
   transmitting data to a user equipment (UE) via both the first flow and the second flow.

2. The method of claim 1, wherein the second flow comprises an inter-RNC link between the S-RNC and the D-RNC and an RNC-network entity link between the D-RNC and the second network entity.

3. The method of claim 1, further comprising:
performing flow control over the first flow and the second flow via the S-RNC.

4. The method of claim 1, further comprising:
transmitting a radio link setup request to the D-RNC, wherein the radio link setup request comprises a request for setting up a multiflow leg to the second network entity.

5. The method of claim 4, wherein the D-RNC transmits a radio link setup response in response to the radio link setup request transmitted by the S-RNC.

6. The method of claim 5, wherein the radio link setup response includes a tunnel upstream pointer associated with the second network entity.

7. An apparatus for multiflow wireless communication, comprising:
means for establishing a first flow between a S-RNC and a first network entity, wherein the S-RNC controls the first network entity;
means for establishing a second flow directly between the S-RNC and a second network entity, wherein a drift radio network controller (D-RNC) controls the second network entity; and
means for transmitting data to a UE via both the first flow and the second flow.

8. The apparatus of claim 7, wherein the second flow comprises an inter-RNC link between the S-RNC and the D-RNC and an RNC-network entity link between the D-RNC and the second network entity.

9. The apparatus of claim 7, further comprising:
means for performing flow control over the first flow and the second flow via the S-RNC.

10. The apparatus of claim 7, further comprising:
means for transmitting a radio link setup request to the D-RNC, wherein the radio link setup request comprises a request for setting up a multiflow leg to the second network entity.

11. The apparatus of claim 10, wherein the D-RNC transmits a radio link setup response in response to the radio link setup request transmitted by the S-RNC.

12. The apparatus of claim 11, wherein the radio link setup response includes a tunnel upstream pointer associated with the second network entity.

13. A non-transitory computer-readable medium storing computer-executable code, comprising:
code for establishing a first flow between a S-RNC and a first network entity, wherein the S-RNC controls the first network entity;
code for establishing a second flow directly between the S-RNC and a second network entity, wherein a drift radio network controller (D-RNC) controls the second network entity; and
code for transmitting data to a UE via both the first flow and the second flow.

14. The computer-readable medium of claim 13, wherein the second flow comprises an inter-RNC link between the S-RNC and the D-RNC and an RNC-network entity link between the D-RNC and the second network entity.

15. The computer-readable medium of claim 13, wherein the computer-executable code further comprises
performing flow control over the first flow and the second flow via the S-RNC.

16. The computer-readable medium of claim 13, wherein the computer-executable code further comprises code for transmitting a radio link setup request to the D-RNC, wherein the radio link setup request comprises a request for setting up a multiflow leg to the second network entity.

17. The computer-readable medium of claim 16, wherein the D-RNC transmits a radio link setup response in response to the radio link setup request transmitted by the S-RNC.

18. The computer-readable medium of claim 17, wherein the radio link setup response includes a tunnel upstream pointer associated with the second network entity.

19. An apparatus for wireless communication, comprising:
at least one processor; and
a memory coupled to the at least one processor, wherein the at least one processor is configured to:
establish a first flow between a S-RNC and a first network entity, wherein the S-RNC controls the first network entity;
establish a second flow directly between the S-RNC and a second network entity, wherein a drift radio network controller (D-RNC) controls the second network entity; and
transmit data to a UE via both the first flow and the second flow.

20. The apparatus of claim 19, wherein the second flow comprises an inter-RNC link between the S-RNC and the D-RNC and an RNC-network entity link between the D-RNC and the second network entity.

21. The apparatus of claim 19, wherein the at least one processor is further configured to:
perform flow control over the first flow and the second flow via the S-RNC.

22. The apparatus of claim 19, wherein the at least one processor is further configured to:
transmit a radio link setup request to the D-RNC, wherein the radio link setup request comprises a request for setting up a multiflow leg to the second network entity.

23. The apparatus of claim 22, wherein the D-RNC transmits a radio link setup response in response to the radio link setup request transmitted by the S-RNC.

24. The apparatus of claim 23, wherein the radio link setup response includes a tunnel upstream pointer associated with the second network entity.

* * * * *